(12) United States Patent
Peterson

(10) Patent No.: US 6,203,095 B1
(45) Date of Patent: Mar. 20, 2001

(54) BODY PROTECTOR ASSEMBLY FOR A VEHICLE

(76) Inventor: Del Roy Peterson, 36789 San Pedro Dr. #234, Fremont, CA (US) 94536

( * ) Notice: Subject to any disclaimer, the term of this patent is extended or adjusted under 35 U.S.C. 154(b) by 0 days.

(21) Appl. No.: 09/497,924

(22) Filed: Feb. 4, 2000

(51) Int. Cl.[7] .............................. B60J 7/20; B62D 25/06
(52) U.S. Cl. ............................................ 296/136; 293/128
(58) Field of Search ........................... 296/136; 293/128, 293/DIG. 6; 160/370.21; 150/166

(56) References Cited

U.S. PATENT DOCUMENTS

| | | |
|---|---|---|
| D. 377,928 | 2/1997 | Tillery . |
| 4,315,535 * | 2/1982 | Battle . |
| 4,938,522 | 7/1990 | Herron et al. . |
| 5,176,421 | 1/1993 | Fasiska . |
| 5,343,915 | 9/1994 | Newsome . |
| 5,605,369 | 2/1997 | Ruiz . |
| 5,653,492 | 8/1997 | Mills . |
| 5,890,525 * | 4/1999 | Shores . |
| 5,984,401 * | 11/1999 | Hannah . |
| 6,044,881 * | 4/2000 | Welch et al. . |
| 6,062,617 * | 5/2000 | Marks . |

FOREIGN PATENT DOCUMENTS

1367578 * 6/1964 (FR) .

* cited by examiner

*Primary Examiner*—D. Glenn Dayoan
*Assistant Examiner*—Scott Carpenter

(57) ABSTRACT

A body protector assembly for a vehicle for preventing dents and keeping one's vehicle clean. The body protector assembly for a vehicle includes a plurality of thin pieces of material made essentially of plastic and adapted to removably attached to selected parts of a body of a vehicle with powerful magnetic fastening members. A plurality of elongate impact-resistant members are securely mounted to the thin pieces of material with loop members. A sufficiently thin, durable sheet of material is detachably mounted to an underside of a vehicle with fasteners. The sufficiently thin pieces of material can be detachably attached to the thin, durable sheet of material.

12 Claims, 3 Drawing Sheets

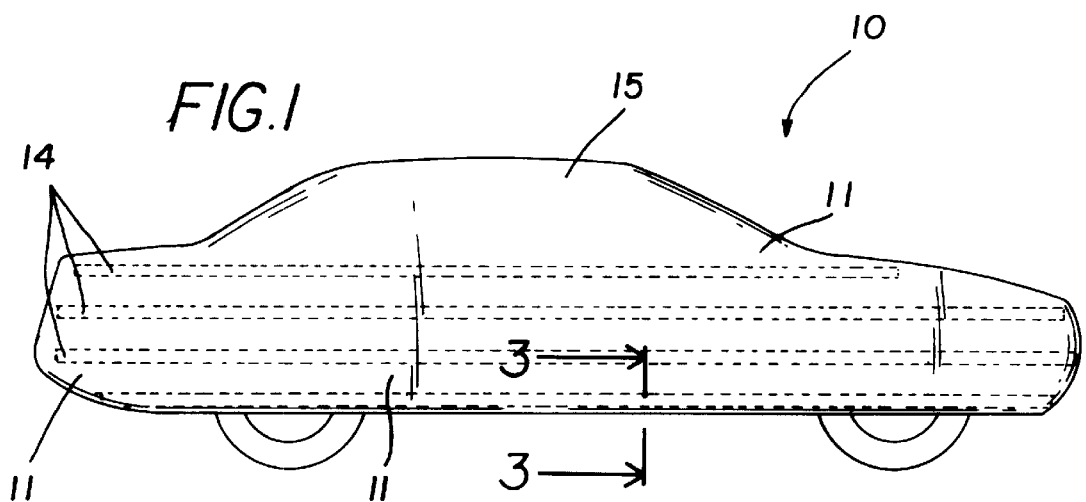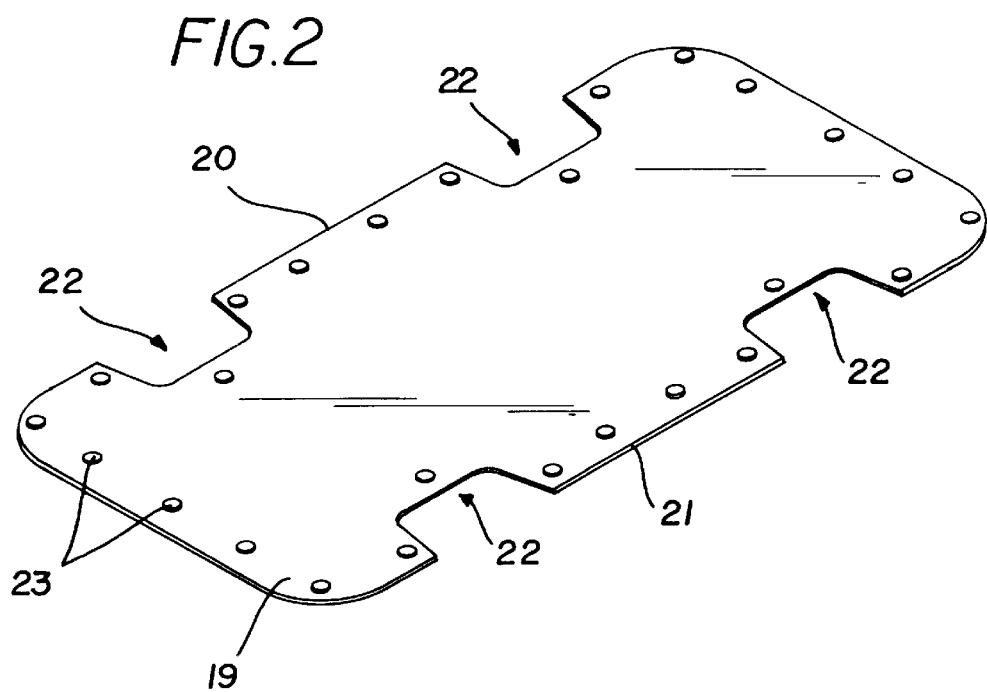

BODY PROTECTOR ASSEMBLY FOR A VEHICLE

BACKGROUND OF THE INVENTION

1. Field of the Invention

The present invention relates to a means for protecting ones vehicle from being scratched, dented or chipped and more particularly pertains to a new body protector assembly for a vehicle for preventing scratches, dents and keeping one's vehicle clean.

2. Description of the Prior Art

The use of a means for protecting ones vehicle from being scratched, dented or chipped is known in the prior art. More specifically, a means for protecting ones vehicle from being scratched, dented or chipped heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,343,915; U.S. Pat. No. 5,653,492; U.S. Pat. No. 5,605,369; U.S. Pat. No. 4,938,522; U.S. Pat. No. 5,176,421; and U.S. Pat. No. Des. 377,928

While these devices fulfill their respective, particular objectives and requirements, the aforementioned patents do not disclose a new body protector assembly for a vehicle. The inventive device includes a plurality of sufficiently thin pieces of material made essentially of plastic and adapted to removably attached to selected parts of a body of a vehicle with powerful magnetic fastening members. A plurality of elongate impact-resistant members are securely mounted to the thin pieces of material with loop members. A thin, durable sheet of material is detachably mounted to an underside of a vehicle with fasteners. The sufficiently thin pieces of material can be detachably attached to the thin, durable sheet of material.

In these respects, the body protector assembly for a vehicle according to the present invention substantially departs from the conventional concepts and designs of the prior art, and in so doing provides an apparatus primarily developed for the purpose of preventing scratches or dents and keeping one's vehicle clean.

SUMMARY OF THE INVENTION

In view of the foregoing disadvantages inherent in the known types of a means for protecting ones vehicle from being scratched, dented or chipped now present in the prior art, the present invention provides a new body protector assembly for a vehicle construction wherein the same can be utilized for preventing dents or scratches and keeping one's vehicle clean.

The general purpose of the present invention, which will be described subsequently in greater detail, is to provide a new body protector assembly for a vehicle apparatus and method which has many of the advantages of the a means for protecting ones vehicle from being scratched, dented or chipped mentioned heretofore and many novel features that result in a new body protector assembly for a vehicle which is not anticipated, rendered obvious, suggested, or even implied by any of the prior art a means for protecting ones vehicle from being scratched, dented or chipped, either alone or in any combination thereof.

To attain this, the present invention generally comprises a plurality of thin pieces of material made essentially of plastic and adapted to removably attached to selected parts of a body of a vehicle with powerful magnetic suction cup fastening members. A plurality of elongate impact-resistant members are securely mounted to the thin pieces of material with loop members. A thin, durable sheet of material is detachably mounted to an underside of a vehicle with fasteners. The sufficiently thin pieces of material can be detachably attached to the sufficiently thin, durable sheet of material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new body protector assembly for a vehicle apparatus and method which has many of the advantages of the a means for protecting ones vehicle from being scratched, dented or chipped mentioned heretofore and many novel features that result in a new body protector assembly for a vehicle which is not anticipated, rendered obvious, suggested, or even implied by any of the prior art a means for protecting ones vehicle from being dented or chipped, either alone or in any combination thereof.

It is another object of the present invention to provide a new body protector assembly for a vehicle which may be easily and efficiently manufactured and marketed.

It is a further object of the present invention to provide a new body protector assembly for a vehicle which is of a durable and reliable construction.

An even further object of the present invention is to provide a new body protector assembly for a vehicle which is susceptible of a low cost of manufacture with regard to both materials and labor, and which accordingly is then susceptible of low prices of sale to the consuming public, thereby making such body protector assembly for a vehicle economically available to the buying public.

Still yet another object of the present invention is to provide a new body protector assembly for a vehicle which provides in the apparatuses and methods of the prior art some of the advantages thereof, while simultaneously overcoming some of the disadvantages normally associated therewith.

Still another object of the present invention is to provide a new body protector assembly for a vehicle for preventing scratches, dents and keeping one's vehicle clean.

Yet another object of the present invention is to provide a new body protector assembly for a vehicle which includes a plurality of thin pieces of material made essentially of plastic and adapted to removably attached to selected parts of a body of a vehicle with powerful magnetic fastening members. A plurality of elongate impact-resistant members are securely mounted to the thin pieces of material with loop members. A sufficiently thin, durable sheet of material is detachably mounted to an underside of a vehicle with fasteners. The sufficiently thin pieces of material can be detachably attached to the thin, durable sheet of material.

Still yet another object of the present invention is to provide a new body protector assembly for a vehicle that can be easily and conveniently installed using the powerful magnetic suction cup fastening members and fasteners.

Even still another object of the present invention is to provide a new body protector assembly for a vehicle that prevents scratches or dents to the sides of the vehicle due to others opening their vehicle doors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a new body protector assembly for a vehicle according to the present invention.

FIG. 2 is a perspective view of the undercarriage protection means of the present invention.

DESCRIPTION OF THE PREFERRED EMBODIMENT

Figure 3:
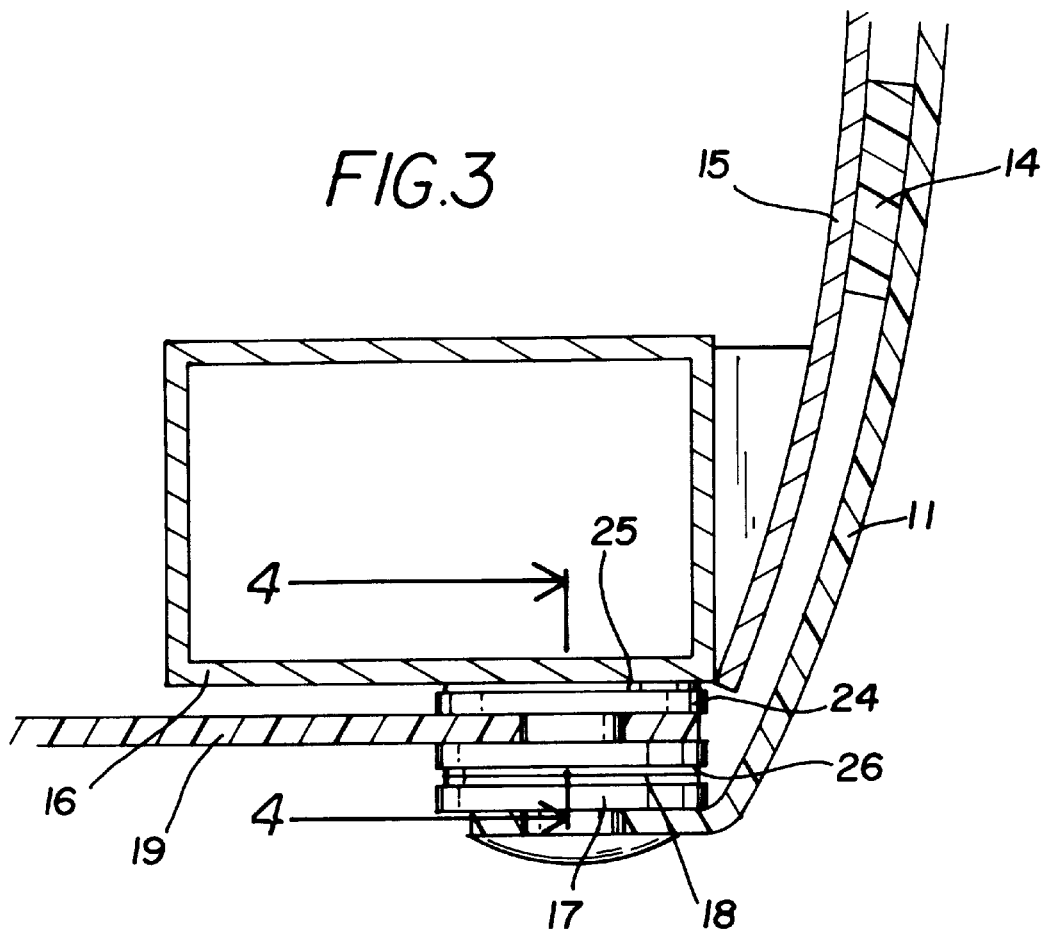
FIG. 3 is a detailed view of the attaching means on the underside of a vehicle of the present invention.
Figure 4:
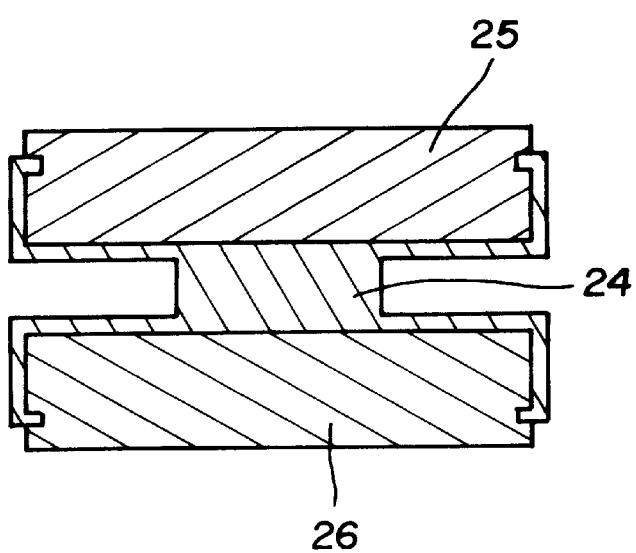
FIG. 4 is a detailed view of the fastener of the present invention.
Figure 5:
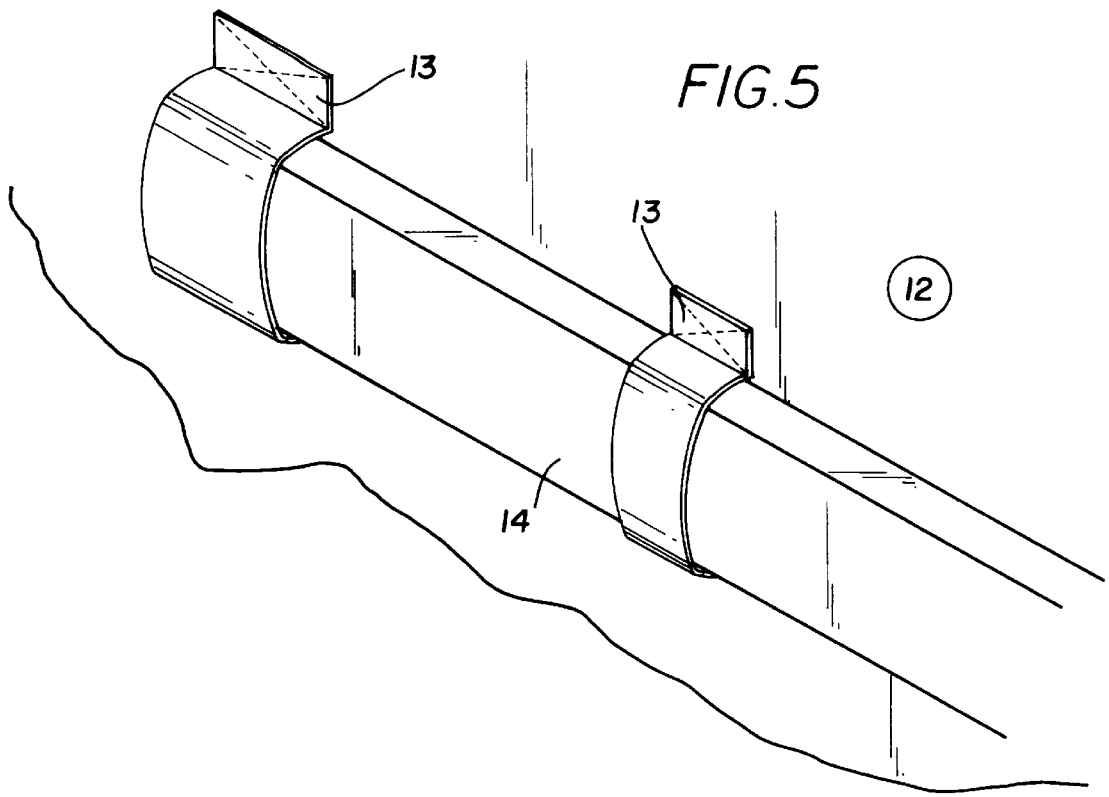
FIG. 5 is a perspective view of the bracket means and the elongate impact-resistant member the present invention.
Figure 6:
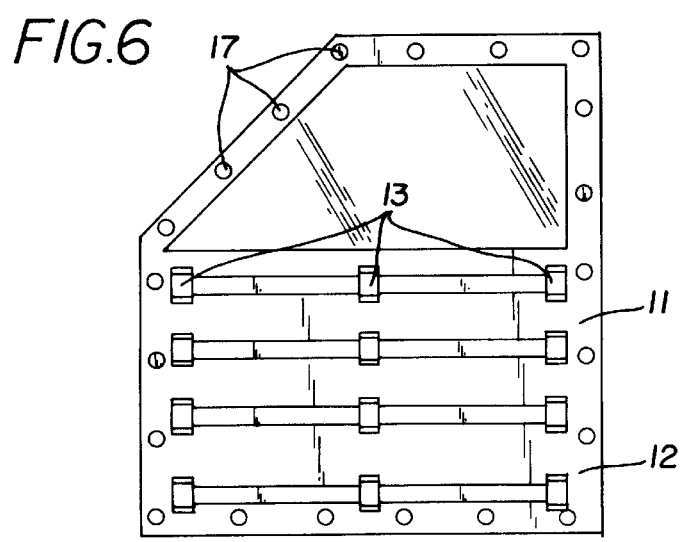
FIG. 6 is a side elevational view of the thin piece of material of the present invention.

With reference now to the drawings, and in particular to FIGS. 1 through 6 thereof, a new body protector assembly for a vehicle embodying the principles and concepts of the present invention and generally designated by the reference numeral 10 will be described.

As best illustrated in FIGS. 1 through 6, the body protector assembly for a vehicle 10 generally comprises a plurality of thin pieces of material 1 adapted to cover selected body surfaces of a vehicle and having sides 12 facing a body 15 of a vehicle. An undercarriage protection means is detachably connected to a vehicle, and includes a thin, durable sheet of material 19 adapted to essentially cover all of an underside 16 of a vehicle and having a pair of longitudinal edges 20,21 and further having a plurality of fasteners 23 securely attached along a perimeter of the sheet of material 19 for removably attaching the sheet of material 19 to an underside 16 of a vehicle. The sheet of material 19 has a plurality of slots 22 spaced apart and extending in the longitudinal edges 21,22. The slots 22 are disposed relative to wheels of a vehicle. Each of the fasteners 23 includes a bracket member 24, a powerful magnetic suction member 25 securely and conventionally attached to a first side of the bracket member 24, and a powerful magnetic suction cup conducting member 26 securely and conventionally attached to a second side of the bracket member 24. A plurality of elongate impact-resistant members 14 are removably mounted to the sufficiently thin pieces of material 11 with the elongate impact-resistant members 14 being removably mounted to the body-facing sides 12 of the sufficiently thin pieces of material 11 and being essentially made of a plastic material. A plurality of bracket means are securely and conventionally attached to the thin pieces of material 11 for supporting the elongate impact-resistant members 14 and include a plurality of flexible loop members 13 having ends securely attached or sewn to the thin pieces of material 11. Each of the loop members 13 is adapted to receive and hold a respective elongate impact-resistant member 14 between itself and a respective thin piece of material 11. A plurality of powerful magnetic suction fastening members 17 extend through and are securely attached to the thin pieces of material 11 for removably attaching to a body 15 of a vehicle. Each of the fastening members 17 includes a powerful magnetic suction portion 18 having a surface adapted to detachably attach to a body 15 of a vehicle and also being adapted to detachably attach to a respective magnetic-conducting member 26. The powerful magnetic fastening members 17 are securely attached along perimeters of the thin pieces of material 11 which are essentially made of plastic. As a second embodiment, the thin pieces of material 11 can be essentially welded together to form one complete cover which would fit about a body 15 of a vehicle.

In use, the sufficiently thin pieces of material 11 are fastened over the selected parts of the body 15 of the vehicle using the fastening members 17 with the powerful magnetic suction cup portions 18, and the thin, durable sheet of material 19 is fastened to the underside 16 of the vehicle with the fasteners 23. The thin pieces of material 11 can be further fastened to the underside 16 of the vehicle with the fastening members 17 along the bottom edges of the thin pieces of material 11 being detachably attached to the fasteners 23 on the thin, durable sheet of material 19 which is essentially made of plastic.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A body protector assembly for a vehicle comprising:

a plurality of thin pieces of material adapted to cover selected body surfaces of a vehicle and having sides facing a body of a vehicle;

an undercarriage protection means detachably connected to a vehicle;

a plurality of elongate impact-resistant members removably mounted to said thin pieces of material;

a plurality of bracket means securely attached to said thin pieces of material for supporting said elongate impact-resistant members; and a plurality of powerful magnetic suction cup fastening members securely attached to said thin pieces of material for removably attaching to a body of a vehicle.

2. A body protector assembly for a vehicle as described in claim 1, wherein said undercarriage protection means includes a thin, durable sheet of material adapted to essentially cover all of an underside of a vehicle and having a pair of longitudinal edges and further having a plurality of powerful magnetic suction cup fasteners securely attached along a perimeter of said sheet of material for removably attaching said sheet of material to an underside of a vehicle.

3. A body protector assembly for a vehicle as described in claim 2, wherein said sheet of material includes a plurality of slots spaced apart and extending in said longitudinal edges, said slots being disposed relative to wheels of a vehicle.

4. A body protector assembly for a vehicle as described in claim 3, wherein each of said fasteners includes a bracket member, a magnetic suction member securely attached to a first side of said bracket member, and a powerful magnetic-conducting member securely attached to a second side of said bracket member.

5. A body protector assembly for a vehicle as described in claim 4, wherein said elongate impact-resistant members are removably mounted to said body-facing sides of said thin pieces of material.

6. A body protector assembly for a vehicle as described in claim 5, wherein said bracket means includes a plurality of flexible loop members having ends securely attached to said thin pieces of material, each of said loop members being adapted to receive and hold a respective elongate impact-resistant member between itself and a respective said thin piece of material.

7. A body protector assembly for a vehicle as described in claim 6, wherein each of said elongate impact-resistant members is essentially made of a plastic material.

8. A body protector assembly for a vehicle as described in claim 7, wherein each of said fastening members includes a powerful magnetic portion having a surface adapted to detachably attach to a body of a vehicle and also being adapted to detachably attach to a respective said powerful magnetic suction cup conducting member.

9. A body protector assembly for a vehicle as described in claim 8, wherein said fastening members are securely attached along perimeters of said thin pieces of material which are essentially made of plastic.

10. A body protector assembly for a vehicle as described in claim 9, wherein said thin pieces of material are integrally attached so as to form one cover for a vehicle.

11. A body protector assembly for a vehicle comprising:

a plurality of thin pieces of material adapted to cover selected body surfaces of a vehicle and having sides facing a body of a vehicle;

an undercarriage protection means detachably connected to a vehicle, and including a thin, durable sheet of material adapted to essentially cover all of an underside of a vehicle and having a pair of longitudinal edges and further having a plurality of fasteners securely attached along a perimeter of said sheet of material for removably attaching said sheet of material to an underside of a vehicle, said sheet of material having a plurality of slots spaced apart and extending in said longitudinal edges, said slots being disposed relative to wheels of a vehicle, each of said fasteners including a bracket member, a powerful magnetic member securely attached to a first side of said bracket member, and a magnetic suction cup conducting member securely attached to a second side of said bracket member a plurality of elongate impact-resistant members removably mounted to said thin pieces of material, said elongate impact-resistant members being removably mounted to said body-facing sides of said thin pieces of material and being essentially made of a plastic material;

a plurality of bracket means securely attached to said thin pieces of material for supporting said elongate impact-resistant members and including a plurality of flexible loop members having ends securely attached to said thin pieces of material, each of said loop members being adapted to receive and hold a respective elongate impact-resistant member between itself and a respective said thin piece of material; and a plurality of fastening members securely attached to said thin pieces of material for removably attaching to a body of a vehicle, each of said fastening members including a powerful magnetic portion having a surface adapted to detachably attach to a body of a vehicle and also being adapted to detachably attach to a respective said powerful magnetic-conducting member, said fastening members being securely attached along perimeters of said thin pieces of material which are essentially made of plastic.

12. A body protector assembly for a vehicle as described in claim 11, wherein said thin pieces of material are integrally attached so as to form one cover for a vehicle.

* * * * *